J. SCHIRRA.
NUT LOCK.
APPLICATION FILED FEB. 29, 1908.
914,192.
Patented Mar. 2, 1909.
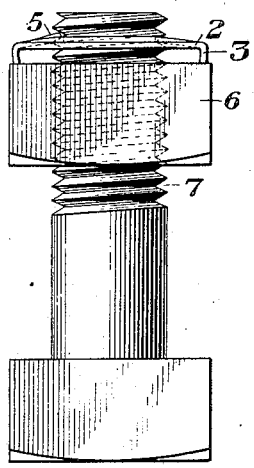
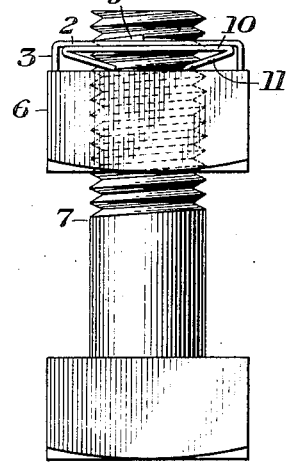
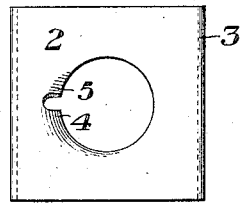
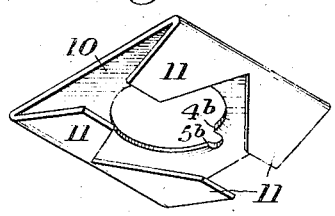
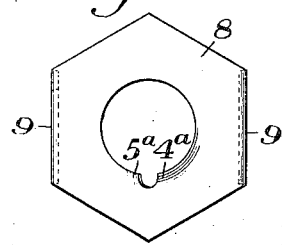
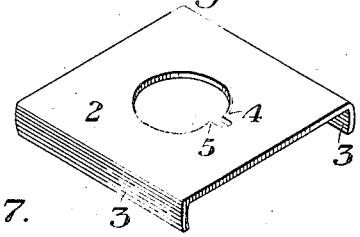
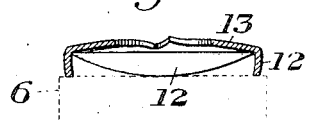
WITNESSES
R. H. Balderson
W. W. Swartz
INVENTOR
Julius Schirra,
by Bakewell, Byrnes & Parmelee,
his Attys

UNITED STATES PATENT OFFICE.

JULIUS SCHIRRA, OF PITTSBURG, PENNSYLVANIA, ASSIGNOR TO E. A. LORTZ, OF PITTSBURG, PENNSYLVANIA.

NUT-LOCK.

No. 914,192.      Specification of Letters Patent.      Patented March 2, 1909.

Application filed February 29, 1908. Serial No. 418,470.

*To all whom it may concern:*

Be it known that I, JULIUS SCHIRRA, of Pittsburg, in the county of Allegheny and State of Pennsylvania, have invented a new and useful Improvement in Nut-Locks, of which the following is a full, clear, and exact description, reference being had to the accompanying drawings, forming part of this specification, in which—

Figure 1 is a side elevation of a bolt and nut provided with my improved nut lock; Fig. 2 is a plan view of the nut lock of Fig. 1; Fig. 3 is a plan view of a modified form of washer; and Figs. 4, 5, 6 and 7 are views showing other forms, Fig. 5 being a detail of a portion of Fig. 4.

My invention relates to the class of nut locks, and is designed to provide a cheap and simple device of this character, which can be turned out in large quantities and will effectually lock the nut against turning on the bolt.

To that end the invention comprises a washer having a hole provided with a notch at one side, at least one of the notched walls being bent so that the thread of the bolt is engaged on one side of one wall of the notch and on the other side of the other wall of the notch.

It also consists in the construction and arrangement of the parts as hereinafter fully described and claimed.

In the drawings, referring to the forms of Figs. 1, 2 and 6; 2 represents a piece of sheet metal having its ends bent or flanged downwardly, as shown at 3. This piece or plate is provided with a central hole having a side notch, of which one wall 4 is bent laterally, while the other wall 5 may remain in its original position or may be bent in the opposite direction. Preferably, the walls 4 and 5 are bent in opposite directions. In using the device, when the nut 6 has been screwed upon the threads of the bolt 7, the nut lock is screwed to its desired position into engagement with the nut. Any attempt of the nut to back off is then resisted by the walls 4 and 5 engaging a thread of the bolt. As the tendency to turn backwardly increases, the tightening action of the nut lock is increased, owing to the pinching of the thread between the two walls of the notch. The side flanges or lips aid in this action, as they give a springy action to the clamping of the thread. The function of these lips is to give this springy action.

Instead of using a square or rectangular plate, I may employ a plate 8 of general hexagonal form, as shown in Fig. 3, this preferably having the side flanges 9 9, as before, and also the notch with the oppositely bent walls $4^a$ and $5^a$. Of course, the number of lips or flanges on the plate may be varied, any desirable number being employed.

In Figs. 4 and 5 I show a form wherein an additional washer 10 is employed between the nut and the main washer, this additional washer having inwardly bent prongs 11, which are notched to engage the threads with their inner walls. These prongs are of a springy character, and as the nut attempts to back off, I obtain not only the action of the lock proper 2, but also the clamping of the prongs of the added washer into the threads of the bolt. Where both the nut lock and the washer are used, as in Fig. 4, the hole through the washer may be an ordinary cylindrical hole. This washer 10 may also be employed alone as a nut lock, in which case it will be provided with the notch having the oppositely bent walls $4^b$ and $5^b$, as in the first form.

In Fig. 7, I show a form similar to that of Figs. 2 and 6, except that the nut lock is made from a round disk of sheet metal, the sides of the circle being struck down into curved flanges 12, each flange contacting with the nut at its central portion. These flanges are also preferably bowed inwardly slightly, as shown by the cross section, and the body 13 is also preferably bowed slightly, as shown in this figure. This bowing aids in giving the springy action and in preventing improper deflection. In this case, the notch with the oppositely bent walls will be employed.

In all the forms of my invention, the inturned flanges of the washer (3, 9, or 12) bear against the end face of the nut at points between the planes of the opposite side of the nut. This enables the washer to be used with ordinary nuts of all sizes.

The advantages of my invention result from the simplicity of the device, its cheapness and also in the efficiency of the clamping and gripping action afforded by the oppositely projecting walls of the notch.

Many changes may be made in the shape and arrangement of the nut lock, without departing from my invention.

I claim:

1. As a new article of manufacture, a nut-locking washer in the form of a thin flat piece of sheet metal with a hole therethrough, said hole having a single notch in one side and one corner of the wall of said notch being bent laterally to form a lip, opposite edge portions of the flat sheet metal piece being bent at an angle to form inwardly projecting flanges of equal length to bear against the end face of a nut at points between the planes of opposite sides of the nut; substantially as described.

2. A nut lock consisting of two washers superimposed one upon the other on the end portion of the bolt, and each having lips which engage the thread of the bolt, the inner washer having opposite edges bent inwardly and engaging the threads of the bolt adjacent to the end face of the nut, and the outer washer having opposite edge portions bent downwardly into engagement with the end face of the nut; substantially as described.

3. A nut lock comprising two superimposed plates or washers engaging the thread of the end portion of the bolt, one of said washers having lips which engage the thread of the bolt adjacent to the end face of the nut, and the other of which has lips which bear against the end face of the nut; substantially as described.

4. A nut lock having a washer formed with a bolt hole therethrough with a notch at one side thereof, one wall of said notch being bent laterally, and opposite edge portions of the plate being bent at an angle to bear upon the end face of the nut, and a second washer inclosed by the first washer and upon which it bears, the second washer also engaging the threads of the bolt; substantially as described.

In testimony whereof, I have hereunto set my hand.

JULIUS SCHIRRA.

Witnesses:
 GEO. B. BLEMING,
 E. A. LORTZ.